US012620256B2

(12) United States Patent
Aggarwal et al.

(10) Patent No.: US 12,620,256 B2
(45) Date of Patent: May 5, 2026

(54) SYSTEM TO PROVIDE MULTICONFIGURATION BIOMETRIC HARDWARE COMPATIBILITY

(71) Applicant: AMAZON TECHNOLOGIES, INC., Seattle, WA (US)

(72) Inventors: Manoj Aggarwal, Seattle, WA (US); Gerard Guy Medioni, Los Angeles, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 741 days.

(21) Appl. No.: 18/051,214

(22) Filed: Oct. 31, 2022

(65) Prior Publication Data

US 2024/0153301 A1 May 9, 2024

(51) Int. Cl.
 *G06V 40/13* (2022.01)
 *H04L 9/32* (2006.01)
(52) U.S. Cl.
 CPC ............ *G06V 40/13* (2022.01); *H04L 9/3231* (2013.01); *H04L 2209/12* (2013.01)
(58) Field of Classification Search
 None
 See application file for complete search history.

(56) References Cited

U.S. PATENT DOCUMENTS

| | | | | |
|---|---|---|---|---|
| 2019/0188285 A1 * | 6/2019 | Scheau | .................. | G06N 5/022 |
| 2024/0037347 A1 * | 2/2024 | Lee | ......................... | G06F 40/47 |

FOREIGN PATENT DOCUMENTS

WO WO-2020251976 A1 * 12/2020 ........... G06T 1/0028

OTHER PUBLICATIONS

Tang, Xiaofan, "Patent Cooperation Treaty International Preliminary Report on Patentabilityand Written Opinion dated May 15, 2025", Patent Cooperation Treaty Application Number PCT/US23/74702 , Patent Cooperation Treaty, May 15, 2025.
"Learning With Partners to Improve the Multi-Source Cross-Dataset Palmprint Recognition", IEEE Transactions on Information Forensics and Security, vol. 16, 2021, pp. 5182-5194.
Anand, et al., "Cross-Sensor Pore Detection in High-Resolution Fingerprint Images", IEEE Sensors Journal, vol. 22, No. 1, Jan. 1, 2022, pp. 555-564.

(Continued)

*Primary Examiner* — Thomas D Lee
(74) *Attorney, Agent, or Firm* — Lindauer Law, PLLC

(57) ABSTRACT

A biometric identification system processes input data acquired by input devices to determine embeddings used to identify a user. Different types of input devices or hardware configurations of input devices may produce different output. Each hardware configuration may be associated with respective representation data. A set of transformer networks are used to transform an embedding from one representation data associated with a first type of device or hardware configuration to another. This enables user participation via different configurations of hardware without requiring users to re-enroll for different input devices or hardware configurations. Opportunistic updates are made to the embeddings as embeddings native to a particular configuration of hardware are acquired from the user.

20 Claims, 9 Drawing Sheets

(56) References Cited

OTHER PUBLICATIONS

Anghelone, et al., "Beyond the Visible", A Survey on Cross-spectral Face Recognition, May 6, 2022, 24 pgs.

Chehade, Thomas, "Patent Cooperation Treaty International Search Report and Written Opinion dated Jan. 16, 2024", Patent Cooperation Treaty Application Number PCT/US23/74702, Patent Cooperation Treaty, Jan. 18, 2024.

George, et al., "Prepended Domain Transformer: Heterogeneous Face Recognition without Bellsand Whistles", IEEE Transactions on Information Forensics and Security, Oct. 12, 2022, pp. 1-16.

Monaco et. al., "Crossing Domains with the Inductive Transfer Encoder", Case Study in Keystroke Biometrics, 8 pgs.

Pillai, et al., "Cross-Sensor Iris Recognition through Kernel Learning", IEEE Transactions on Pattern Analysis and Machine Intelligence, vol. 36, No. 1, Jan. 2014, pp. 73-85.

Shao, et al., "Towards Cross-Dataset Palmprint Recognition via Joint Pixel and Feature Alignment", IEEE Transactions on Image Processing, vol. 30, 2021, pp. 3764-3777.

Wang, et al., "Learning a Compact Vein Discrimination Model With GANerated Samples", IEEE Transactions on Information Forensics and Security, vol. 15, 2020, pp. 635-650.

Zhang, et al., "Study on Reflection-Based Imaging Finger Vein Recognition", IEEE Transactions on Information Forensics and Security, vol. 17, 2022, pp. 2298-2310.

Zhu, et al., "Cross-spectral palmprint recognition with low-rank canonical correlation analysis", Multimedia Tools and Applications, Dec. 31, 2019, pp. 33771-33792, https://doi.org/10.1007/s11042-019-08362-x.

* cited by examiner

500

HAND 102

INPUT DEVICE 104(1)

HARDWARE CONFIGURATION 192(1)

INPUT IMAGE DATA 112 (Query)

HW CONFIGURATION DATA 194(1)

EMBEDDING NETWORK MODULE 120(1)

(QUERY) REPRESENTATION DATA 134(1)

COMPATIBILITY MATRIX DATA 504

MANAGEMENT MODULE 502

TRANSFORMER MODULE 150(2)

(QUERY) FIRST TRANSFORMED REPRESENTATION DATA 156(1)

COMPARISON MODULE 160

ASSERTED IDENTIFICATION DATA 164

ENROLLED USER DATA 140

IDENTIFICATION DATA 142

FIRST REPRESENTATION SPACE 132(1)

FIRST REPRESENTATION DATA 134(1)

SECOND TRANSFORMED REPRESENTATION DATA 156(2)

SECOND REPRESENTATION SPACE 132(2)

SECOND REPRESENTATION DATA 134(2)

FIRST TRANSFORMED REPRESENTATION DATA 156(1)

COMPATIBILITY MATRIX DATA 504

| PHYSICAL CONFIGURATION 602 | HARDWARE CONFIGURATION 192 | FIRST REPRESENTATION SPACE 132(1) (e.g. HW configuration 192(1)) | SECOND REPRESENTATION SPACE 132(2) (e.g. HW configuration 192(2)) | ... | FOURTH REPRESENTATION SPACE 132(4) | FIFTH REPRESENTATION SPACE 132(5) | NTH REPRESENTATION SPACE 132(S) |
|---|---|---|---|---|---|---|---|
| 1 | 1 | Native | Transform | | | | ... |
| 2 | 2 | Transform | Native | | ... | ... | ... |
| 3 | 3 | Transform | No Transformation | | ... | ... | ... |
| 4 | 4 | ... | ... | | Native | Transform | ... |
| 4 | 5 | ... | ... | | Transform | Native | ... |
| ... | ... | | | | ... | ... | ... |
| P | N | | | | ... | ... | ... |

FIG. 6

SYSTEM TO PROVIDE MULTICONFIGURATION BIOMETRIC HARDWARE COMPATIBILITY

BACKGROUND

Biometric input data may be used to assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 5 illustrates a query using native and transformed representation data, according to some implementations.

FIG. 6 illustrates compatibility matrix data indicative of hardware configurations and respective representation data to be transformed in, according to some implementation.

Figure 1A:
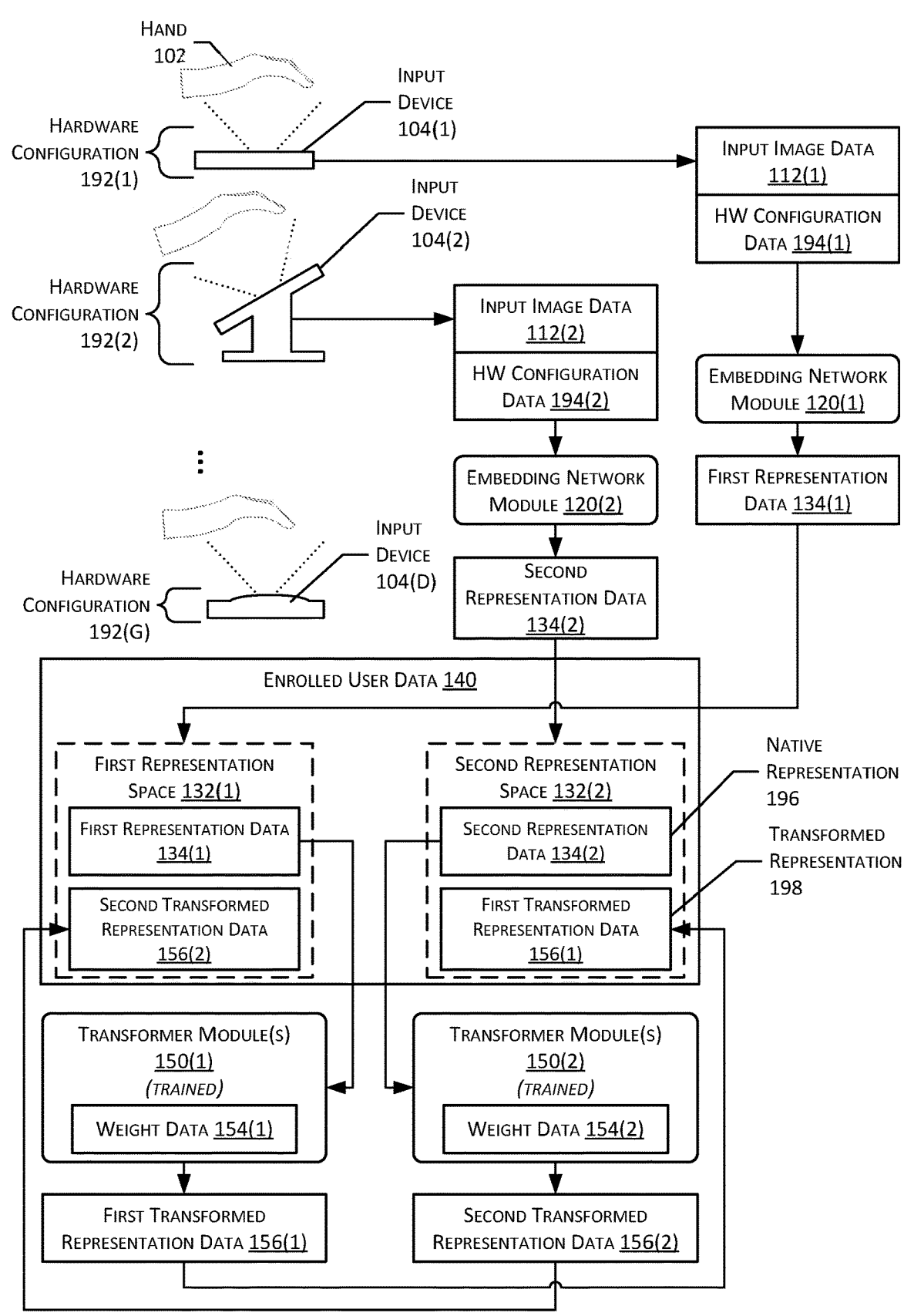
FIGS. 1A and 1B illustrate a system to provide multiconfiguration biometric hardware compatibility, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Input data, such as used for biometric identification, may be acquired using different hardware configurations of input devices. The input devices may acquire input data using one or more modalities. For example, one modality may comprise images of surface skin of a user's palm while a second modality may comprise images of subcutaneous features such as veins of the user's palm.

Different hardware configurations may have different physical configurations, operational characteristics, and so forth. Physical configurations may differ by physical placement of components such as camera(s), illuminator(s), type of camera(s) used, wavelengths of light used, resolution of input data acquired, and so forth. This may result in different hardware configurations acquiring different kinds of input data. For example, a first hardware configuration may acquire input data using two modalities, a second hardware configuration may acquire input data using a single modality and an image resolution of 1 megapixel, a third hardware configuration may acquire input data using the single modality at an image resolution of 5 megapixels, a fourth hardware configuration may acquire input data using three modalities, and so forth.

Overall performance of a biometric identification system may be maximized by tuning specific combinations of hardware configuration with subsequent data processing. During operation, the input data may be processed using an embedding network that provides as output representation data. For example, the embedding network may provide as output a fixed length embedding vector that is representative of features in the input data. The input data may be processed in other ways as well. For example, the input data may be preprocessed using one or more filters, image transforms, and so forth to generate a canonical version of the input data for subsequent processing.

The embedding networks may be trained using the input data associated with a particular hardware configuration. Continuing the earlier example, the first hardware configuration using two modalities may utilize a first embedding network trained to process first modality images and a second embedding network trained to process second modality networks. In comparison, the third hardware configuration using the single modality at relatively high resolution may utilize a third embedding network trained to process this single modality high resolution input data.

Representation data for a particular user acquired during an enrollment process may be used later to determine an asserted identity of a user. During the enrollment process, enrolled user data is determined that associates identification data with enrolled representation data. Once enrolled, the system may be used to identify an unknown user. For example, after enrollment an unknown user uses an input device to provide input data, such as image data of their hand. The input data of the unidentified user is processed to determine query representation data. The query representation data may then be compared with enrolled representation data of previously enrolled users. If the query representation data is deemed to match the enrolled representation, an identity may be asserted.

As mentioned above, the input data generated by different hardware configurations may differ. As a result, the subsequent data processing of the output from those respective hardware configurations may also differ. Continuing the earlier example, each hardware configuration may utilize embedding networks that have been trained using input data that is native to the respective hardware configuration.

From an operational and user perspective, it is desirable for a user to enroll once to use a system. The enrollment process may take several minutes, may involve interaction with a more computationally expensive system, a human operator, and so forth. This poses a challenge in a situation in which each hardware configuration may acquire different input data, may utilize different data processing systems such as different embedding networks, and so forth.

Traditionally a user has been required to perform the enrollment process on every hardware configuration. With each different hardware configuration deployed, the user and the system operator would need to perform the time consuming and costly enrollment process. This is inconvenient to the user and expensive to perform, especially as the number of users utilizing the system increases.

Described in this disclosure are techniques for providing multiconfiguration biometric hardware compatibility by propagating representation data associated with one hardware configuration to another. As a result, users need only enroll once. For a first hardware configuration, first input data is acquired and processed to determine first native representation data associated with that first hardware configuration. The first native representation data is associated with a first representation space, such as a first embedding space of the output of a first trained embedding network used by the first hardware configuration.

The first native representation data is then transformed into other representation spaces associated with other hardware configurations for which compatibility is to be maintained. For example, a transformation matrix may indicate which hardware configurations are cross-compatible. Trained unidirectional transformer networks may be used to transform the native representation data into transformed representation data for a given representation space. The given representation space is associated with a particular hardware configuration.

The transformed representation data may be subsequently used for later queries involving input data acquired using another hardware configuration. For example, if a user is enrolled using a first hardware configuration and later is identified using a second hardware configuration, second native representation data based on input data acquired using the second hardware configuration may be added to the enrolled user data of that user for later use. This facilitates an opportunistic update process, in which native representation data is added as the user interacts with compatible hardware configurations. In some implementations, while using the enrolled user data, the system may preferentially utilize native representation data when available, using transformed representation data when native representation data is unavailable.

By using the techniques described in this disclosure, user experience is substantially improved. The user need only perform the enrollment process once, while still benefiting from the use of different hardware configurations of input devices that are supported by the system. The system operator benefits by removing the need for performing costly re-enrollment. Both the user and the system operator both benefit by the substantial performance improvements, such as greater accuracy in identification and reduced latency, afforded by use of data processing systems that are tuned for a particular hardware configuration. The system operator and user both also benefit by having constraints on further development of the input devices and associated data processing substantially reduced. For example, newer hardware configurations may be less expensive allowing greater deployment, increasing the utility to the user who is now able to use biometric identification in more places.

Illustrative System

Figure 1B:
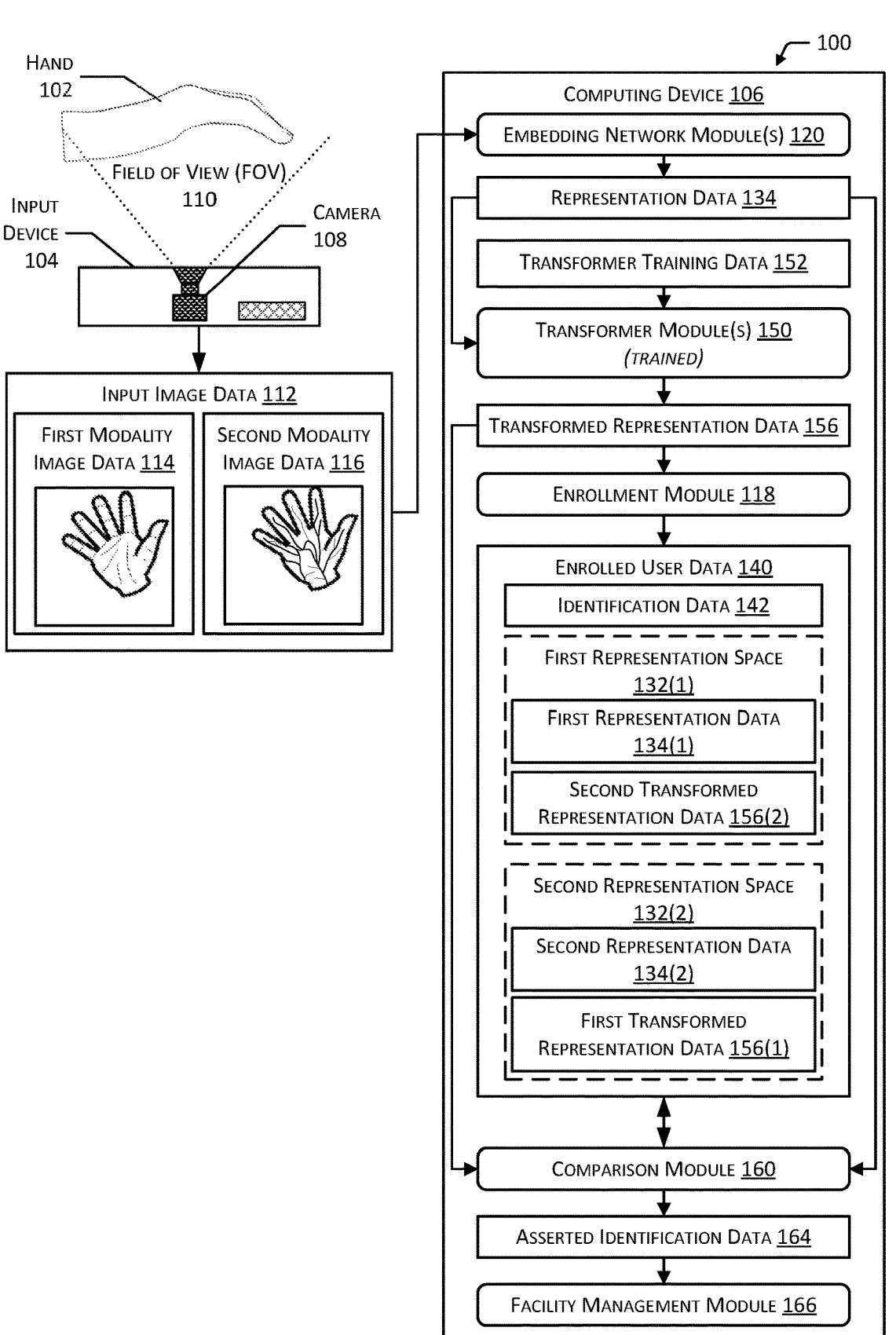

FIGS. 1A and 1B illustrate a system 100 to provide multiconfiguration biometric hardware compatibility, according to some implementations. The system 100 is described as with respect to a biometric identification system that determines an identity of a user. However, the system and techniques described herein may be used in other situations.

For clarity of illustration and not as a limitation, FIGS. 1A and 1B depict different portions of the system 100.

A hand 102 of a user is depicted positioned above an input device 104. The input device 104 may include a computing device and a camera 108. (See FIG. 1B). The camera 108 has a field of view (FOV) 110. During operation of the input device 104, the camera 108 acquires images of an object in the FOV 110, such as the hand 102, and provides input image data 112. The input device 104 may include other components which are not shown. For example, the input device 104 may include lights that illuminate the object in the FOV 110.

As shown in FIG. 1A, the system 100 may include a variety of different input devices 104(1), 104(2), . . . , 104(D). Input devices 104 may be associated with particular hardware configurations 192. For example, the input device 104(1) may be associated with a first hardware configuration 192(1), the second input device 104(2) may be associated with a second hardware configuration 192(2), and so forth. Each hardware configuration 192 may include a plurality of input devices 104. In some implementations the input device 104 may be incorporated within, or may comprise, a smartphone device, a tablet device, a laptop computer, desktop computer, home security device and so forth. For example, the input device 104 may comprise a doorbell camera. In other implementations the input device 104 may comprise a dedicated biometric input device, such as a scanner at a point-of-sale, entry to a secured area, and so forth.

Hardware configurations 192 may differ based on one or more of physical hardware or operation of that hardware. Different physical configurations may differ by physical placement of components such as camera(s) 108, lenses or other optical components, illuminator(s), type of camera(s) used, wavelengths of light used, resolution of input image data 112 acquired, and so forth. In some implementations, monochromatic light may be used, associated with a particular wavelength. In other implementations, the light may comprise a range or band of wavelengths. For example, sets of wavelengths may comprise visible light, near infrared, medium infrared, far infrared, and so forth.

Hardware configurations 192 may also differ based on how the physical configuration is utilized, such as due to different operating modes. For example, a first and second hardware configuration 192 may have the same physical configuration, but one or more features or functions associated with operation of the input device 104 may be limited or operated differently. For example, due to an export restriction that is implemented via programmatic instructions executing on the input device 104, operation of a particular modality may be inhibited. In another example, the same input device 104(1) may be associated with a first hardware configuration 192(1) used at a first time and a second hardware configuration 192(2) used at a second time. Continuing this example, during the daytime the input device 104(1) may be used in a first hardware configuration 192(1), with illuminators operated in a first illumination mode. At a later time, such as during the nighttime, the same input device 104(1) is operated in a second hardware configuration 192(1), in which the illuminators are operated in a second illumination mode. Illumination modes may vary based on number of illuminators used, intensity of light emitted by illuminators during operation, wavelength of light emitted by the illuminator, and so forth.

Different hardware configurations 192 may also be distinguished based on the data processing occurring within the input device 104. For example, a first hardware configuration 192 may involve an image processing pipeline that utilizes Joint Photographic Experts Group (JPEG) compression with a quality setting of 50, a second hardware configuration may involve the image processing pipeline utilizing JPEG compression with a quality setting of 25, while a third hardware configuration 192 involves an image processing pipeline using Portable Network Graphics (PNG) compression. Each of these configurations may use identical physical configurations, share one or more common hardware elements such as a particular type of image signal processor (ISP), and so forth.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the input device 104. In another example, the camera 108 may have a FOV 110 extending horizontally, and the user may place their hand 102 in the FOV 110 facing the input device 104.

The input device 104 may acquire input image data 112 using one or more modalities. In one implementation, the input device 104 is configured to acquire images of the hand 102 that are illuminated using infrared light that has two or more particular polarizations, with different illumination patterns, and so forth. For example, during operation the user may present their hand 102 with the palm or volar region of the hand toward the input device 104. As a result, the input image data 112 provides an image of the anterior portion of the hand 102. In other implementations, the input image data 112 may include the back of the hand 102. Separate images may be acquired using different combinations of polarized light provided by the infrared lights.

Depending upon the polarization used, the images produced by the input device 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by infrared lights. The input image data 112 may comprise information associated with one or more modalities. As shown in FIG. 1B, the input image data 112 may comprise first modality image data 114 and second modality image data 116. The first modality image data 114 and the second modality image data 116 of the same object may be acquired in rapid succession with respect to one another. For example, the camera 108 may operate at 60 frames per second and acquire the first modality image data 114 in a first frame and the second modality image data 116 in a second frame.

In other implementations, other modalities may be used. A third modality may comprise color images acquired using a red-green-blue (RGB) camera using visible light. A fourth modality may comprise depth or distance data that provides information about the shape of the object, such as the hand 102.

In the implementation depicted here, the input device 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the input device 104 may include a structure such as a guide or scan plate to constrain at least some movement of the hand 102. For example, the scan plate may comprise a flat pane of glass which the hand 102 may rest upon, and the camera 108 may then acquire an image.

In some implementations, the input devices 104 may also provide hardware configuration data 194 that is associated with, or included within, the input image data 112. For example, the hardware configuration data 194 may be indicative the particular hardware configuration 192 to which the input device 104 is associated. In some implementations instead of, or in addition to the hardware configuration data 194, a model number, serial number, or other information may be provided.

Users are able to utilize the system 100 by performing an enrollment process. An enrollment module 118 (see FIG. 1B) may coordinate the enrollment process. Enrollment may associate biometric information, such as representation data or transformed representation data, with particular information such as a name, account number, and so forth.

During an enrollment process, the user opts in and presents their hand 102 to the input device 104. The input device 104 provides input image data 112 to a computing device 106 executing an embedding network module 120. The embedding network module 120 comprises a neural network implementing at least one embedding network module 120 that accepts as input the input image data 112 and provides as output representation data 134. The representation data 134 is representative of at least some of the features depicted in the input image data 112. In some implementations the representation data 134 may comprise a vector value in a representation space 132.

In one implementation in which the input image data 112 comprises data associated with a plurality of modalities, a single embedding network module 120 may be used to process the multimodality input image data 112. In another implementation in which the input image data 112 comprises data associated with a plurality of modalities, a plurality of embedding network modules 120 may be used to process respective modalities of the input image data 112.

In some implementations, the input device 104 may include a computing device, and may execute the embedding network module(s) 120. In another implementation, the input device 104 may encrypt and send the input image data 112 or data based thereon, to another computing device 106 such as a server.

During the enrollment process, the submitted representation data 134 may be checked to determine whether the user has been previously enrolled. A successful enrollment may comprise storage of identification data 142, such as name, telephone number, account number, and so forth and storage of one or more of the representation data 134 or the transformed representation data 156 as enrolled user data 140. In some implementations, the enrolled user data 140 may comprise additional information associated with processing of the input image data 112 with an embedding network module 120. For example, the enrolled user data 140 may comprise intermediate layer data, such as the values of a penultimate layer of the embedding network module 120.

Returning to FIG. 1A, a user may use the system 100 by presenting their hand 102 to one of the input devices 104 that are participating to provide cross-compatibility. In some implementations, the user may enroll using any of the input devices 104 associated with participating hardware configurations 192. For this illustration, we will assume that the user has been enrolled using the input device 104(1) that is associated with the first hardware configuration 192(1). The input device 104(1) acquires first input image data 112(1) and provides this to a first embedding network module 120(1) that is associated with the first hardware configuration 192(1). In some implementations, other preprocessing operations may be performed on the input image data 112(1) before processing by the embedding network module 120(1). The input device 104(1) also provides hardware configuration data 194(1) indicative of the first hardware configuration 192(1) to which the first input device 104(1) belongs.

The first embedding network module 120(1) processes the first input image data 112(1) and determines first representation data 134(1). For example, the first representation data 134(1) may comprise a fixed length embedding vector.

The first representation data 134(1) is associated with a first representation space 132(1). The first representation space 132(1) is associated with the first hardware configuration 192(1). Representation data 134 produced by embedding network module(s) 120 associated with a particular representation space 132 may be referred to as a native representation 196. In comparison, transformed representation data 156 may be referred to as a transformed representation 198.

As shown in this illustration, a second input device 104(2) associated with a second hardware configuration 192(2) is also used. The second input device 104(2) provides second input image data 112(2) to a second embedding network module 120(2). The second embedding network module 120(2) is associated with the second hardware configuration 192(2). The second input device 104(2) may also provide hardware configuration data 194(2).

The second embedding network module 120(2) processes the second input image data 112(2) and determines second representation data 134(2).

The second representation data 134(2) is associated with a second representation space 132(2). The second representation space 132(2) is associated with the second hardware configuration 192(2).

The comparison module 160 may compare representation data that are within the same representation space 132. As described above, traditional techniques would involve a user re-enrolling to provide a native representation 196 in each of the participating representation spaces 132.

As shown in FIG. 1A, the system 100 may comprise one or more transformer modules 150(1), 150(2), . . . , 150(T). A transformer module 150 is trained using transformer training data 152 to transform or convert representation data 134 from one representation space 132 to another. Once trained, the transformer module 150 includes weight data 154 that is indicative of weights, bias values, or other values associated with nodes in its neural network that are representative of the resulting training. The training and operation of the transformer module 150 is discussed in more detail in the following figures.

Once trained, the transformer module(s) 150 is used to transform representation data 134 into transformed representation data 156. For example, a transformer module 150 may transform the first representation data 134(1) into the first transformed representation data 156(1). As a result, during subsequent use the second embedding network module 120(2) may be used, and the comparison module 160 is able to operate by comparing query representation data 162 in the second representation space 132(2) with enrolled user data 140 comprising the transformed representation data 156. By utilizing the transformer module(s) 150, during operation of the system 100, the comparison module 160 or other modules may use the transformed representation data 156 until a native representation 196 is available.

In one implementation in which the input image data 112, and corresponding representation data 134, comprises data associated with a plurality of modalities, a single transformer module 150 may be used to process the representation data 134. In another implementation, a plurality of transformer modules 150 may be used to transform representation data 134, or portions thereof associated with particular modalities, into transformed representation data 156.

The transformer module 150 may be unidirectional, in that it is trained to accept as input representation data 134 associated with a first representation space 132(1) and provide as output transformed representation data 156 associated with a second representation space 132(2).

As shown in FIG. 1A, the first representation data 134(1), native to the first representation space 132(1) may be processed by a first transformer module 150(1) to determine first transformed representation data 156(1). The first transformed representation data 156(1), associated with the second representation space 132(2), may then be used to perform a query, stored as enrolled user data 140, and so forth. Similarly, the second representation data 134(2), native to the second representation space 132(2) may be processed by a second transformer module 150(2) to determine second transformed representation data 156(2). The second transformed representation data 156(2), associated with the first representation space 132(1), may then be used to perform a query, stored as enrolled user data 140, and so forth.

While two representation spaces 132 and associated transformer modules 150 are shown, the system 100 may be extended to any number of representation spaces 132. In this illustration, bidirectional cross-compatibility between the representation spaces 132 and associated hardware configurations 192 is provided. That is, a user may continue to use input devices 104 of either hardware configuration 192.

In other implementations, compatibility may be asymmetric. For example, the first hardware configuration 192(1) may be deprecated and discontinued, with the first representation data 134(1) transformed to the second representation space 132(2) for use with input devices 104 of the second hardware configuration 192(2), but not vice versa.

It is understood that the enrolled user data 140 may comprise a plurality of instances of representation associated with a particular user. For example, a single user may have a plurality of native representations 196 stored in the enrolled user data 140, a plurality of transformed representations 198, and so forth.

During subsequent usage, such as at a second time, the (as yet unidentified) user presents their hand 102 at an input device 104. The resulting query input image data 112 may be processed by the first embedding network module 120(1) to determine query representation data 162 (not shown) that is in the first representation space 132(1). The comparison module 160 compares the query representation data 162 to the representation data 134 and transformed representation data 156 stored in the enrolled user data 140 to determine asserted identification data 164. In one implementation, the asserted identification data 164 may comprise a user identifier associated with the closest previously stored representation data 134 or transformed representation data 156 in the enrolled user data 140 to the query representation data 162 associated with the user who presented their hand 102. The comparison module 160 may utilize other considerations, such as requiring that the query representation data 162 is no more than a maximum distance in the representation data from the representation data 134 or transformed representation data 156 of a particular user before determining the asserted identification data 164.

In some implementations, the comparison module 160 may utilize different thresholds or techniques for comparison based on whether the enrolled user data 140 is a native representation 196 or a transformed representation 198. For example, a threshold maximum distance for comparison of a native representation 196 of query representation data 162 to a transformed representation 198 may be less than that involving a comparison to a previously stored native representation 196.

The asserted identification data 164 may then be used by subsequent systems or modules. For example, the asserted identification data 164, or information based thereon, may be provided to a facility management module 166.

The facility management module 166 may use the asserted identification data 164 to associate an identity with that user as they move about the facility. For example, the facility management module 166 may use data from cameras or other sensors in the environment to determine a location of the user. Given a known path of the user from an entrance that utilizes the input device 104, the user identity indicated in the identification data 142 may be associated with the user as they use the facility. For example, the now identified user may walk to a shelf, remove an item, and leave the facility. The facility management module 166 may determine the interaction data indicative of the removal of the item as being associated with the user identifier specified in the asserted identification data 164, and bill an account associated with the user identifier. In another implementation, the facility management module 166 may comprise a point of sale system. The user may present their hand 102 at checkout to assert their identity and pay using a payment account that is associated with their identity.

The system 100 may continue to undergo changes over time. Different embedding network modules 120 may comprise a different neural network architecture, may have used different training data, and so forth. The representation space 132 produced by different embedding network modules 120 may differ. For example, the second representation space 132(2) may have a different number of dimensions from the first representation space 132(1). In another example, the first representation space 132(1) and the second representation space 132(2) may have the same overall dimensionality, but one or more specified dimensions in the first representation space 132(1) are not collinear with one or more specified dimensions in the second representation space 132(2). In some implementations representation space 132 may share one or more common dimensions, or may be completely disjoint.

The systems and techniques described herein are discussed with respect to images of human hands. These systems and techniques may be used with respect to other forms of data, other kinds of objects, and so forth. For example, these techniques may be used for facial recognition systems, object recognition systems, and so forth.

Figure 2:
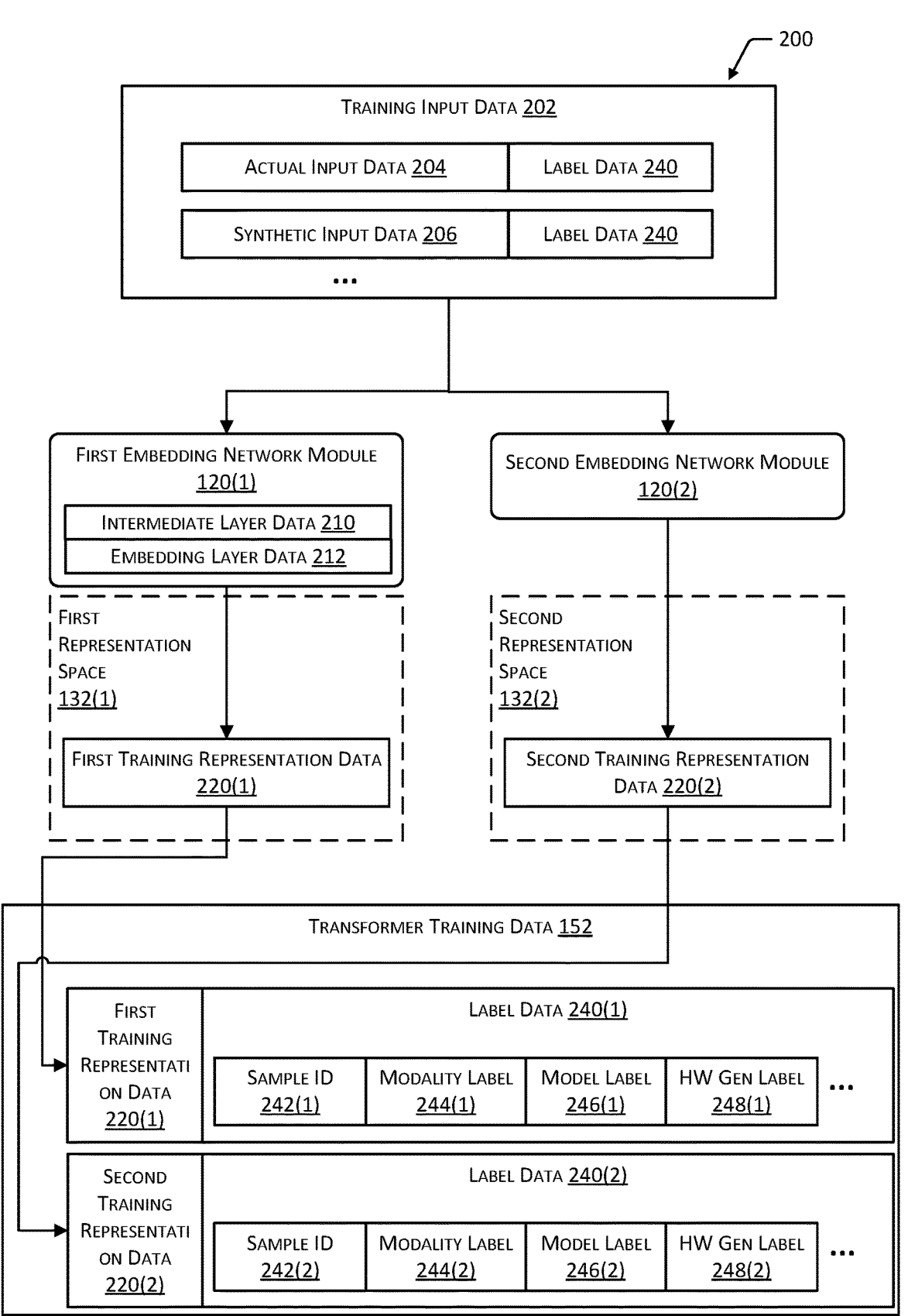
FIG. 2 illustrates processing training input data to determine transformer training data, according to some implementations.

FIG. 2 illustrates at 200 a method of processing training input data to determine transformer training data 152, according to some implementations. The preparation of transformer training data 152 may be implemented by one or more computing devices 106. Transformer training data 152 is acquired for use in training the transformer module 150, with that training expressed as the weight data 154.

Training input data 202 is shown. The training input data 202 may comprise one or more of actual input data 204 with associated label data 240 or synthetic input data 206 with associated label data 240. The actual input data 204 may comprise actual input image data 112 that has been acquired from individuals who have opted in to provide training data. In one implementation, the training input data 202 may exclude individuals who have enrolled to use of the system for identification. In another implementation, some enrolled users may opt in to explicitly permit input image data 112 obtained during enrollment to be stored as actual input data 204 for later training.

The synthetic input data 206 may comprise synthetic data that is consistent with expected input image data 112. For example, the synthetic input data 206 may comprise output from a generative adversarial network (GAN) that has been trained to produce synthetic images of a user's hand. In some implementations, the synthetic data may be based on actual input data 204. In other implementations, other techniques may be used to determine the synthetic input data 206.

The label data 240 may comprise information such as a sample identifier (ID) 242, modality label 244, model label 246, and so forth. The sample ID 242 indicates a particular training identity. The modality label 244 indicates whether the associated input data is representative of a first modality, second modality, and so forth. The model label 246, discussed later may indicate the embedding network module 120 used to determine the training representation data 220.

The training input data 202 is processed by at least two embedding models implemented in two embedding network modules. In the following examples, the first embedding network module 120(1) may be considered the "old" or "existing" embedding network module 120, while the second embedding network module 120(2) may be considered the "new" or "updated" embedding network module 120. For these examples, the first embedding network module 120(1) may be assumed to be deprecated and discontinued for use as an embedding network module 120 at a future time, after which the second embedding network module 120(2) will be used.

The first embedding network module 120(1) is used to process input data from the training input data 202, generating first training representation data 220(1) that is in the first representation space 132(1). In some implementations, the first training representation data 220(1) comprises, or is based on, intermediate layer data 210 and embedding layer data 212. The intermediate layer data 210 may comprise values associated with one or more layers of the first embedding network module 120(1) while processing input. The embedding layer data 212 comprises the representation data that is provided by output of the first embedding network module 120(1). In one implementation, the intermediate layer data 210 may comprise values of a penultimate layer of a neural network of the first embedding network module 120(1). The penultimate layer may comprise the layer preceding the final output of the embedding layer data 212. In one implementation, the intermediate layer data 210 may comprise the values of a fully connected linear layer that precedes the output of the embedding layer data 212. For example, the embedding layer data 212 may have a vector of size 128, while the intermediate layer data 210 has a vector of size of 1280.

Continuing the implementation discussed above, the first training representation data 220(1) may comprise a concatenation of the intermediate layer data 210 and the embedding layer data 212. In other implementations, the intermediate layer data 210 and the embedding layer data 212 may be otherwise combined.

In some implementations, use of the intermediate layer data 210 results in a substantial improvement in overall performance of the system.

The same training input data 202 is also processed with the second embedding network module 120(2), generating second training representation data 220(2). This pair of training representation data 220(1) and 220(2) may be associated with one another by a common value of sample ID 242. This pair is thus representative of the same input data, from the training input data 202, as expressed in two different representation space 132. Each instance of training representation data 220 may have associated label data 240. This associated label data 240 may include a model label 246 that is indicative of the embedding network module 120 used to generate the particular training representation data 220.

The transformer training data 152, comprising first training representation data 220(1), second training representation data 220(2), and associated or implied label data 240 may not be used to train a transformer network module 310 within a transformer module 150, as described next.

Figure 3:
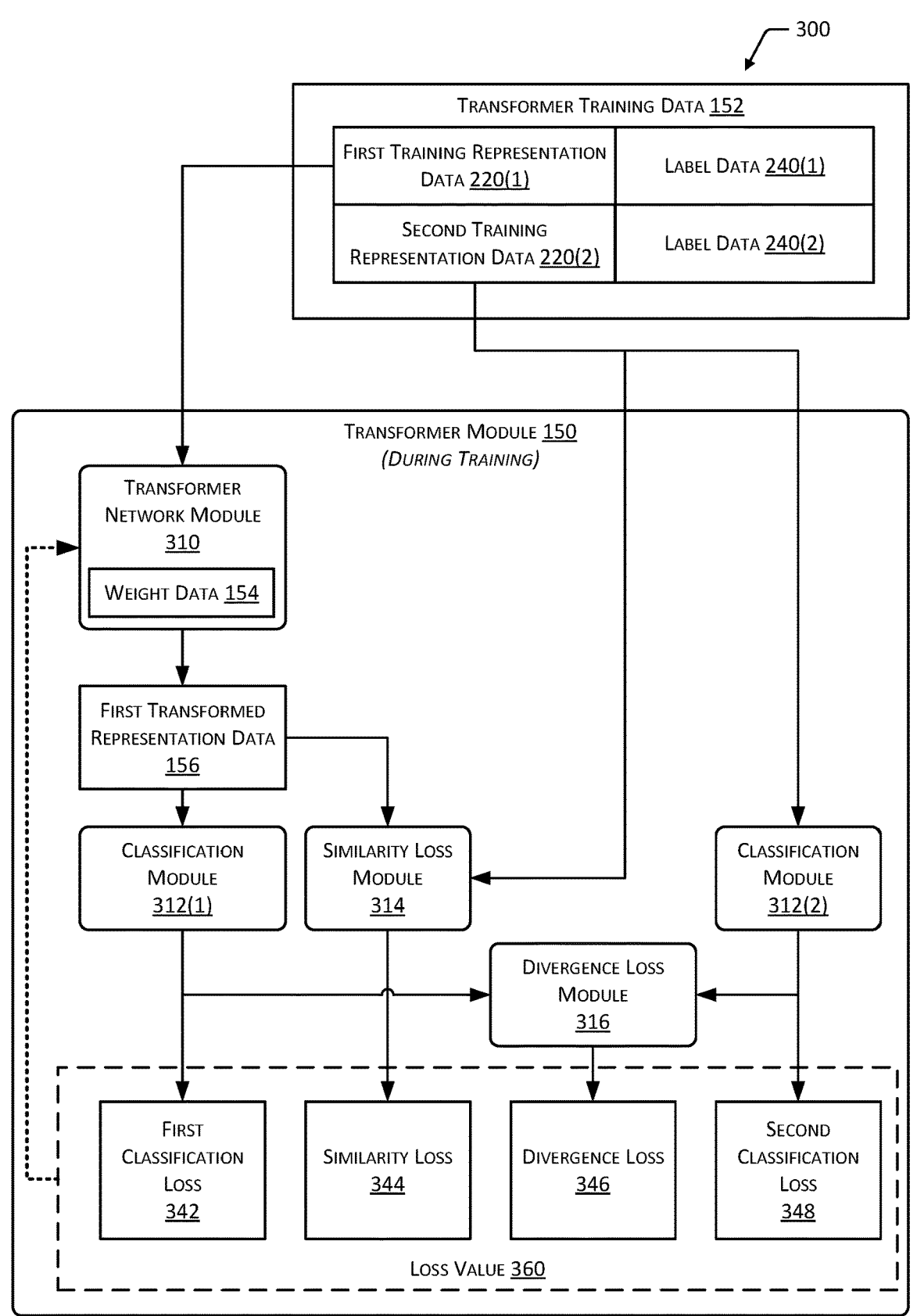
FIG. 3 illustrates a transformer module during training, according to some implementations.

FIG. 3 illustrates a transformer module 150 during training, according to some implementations. The transformer module 150 may be implemented by one or more computing devices 106. The transformer module 150 comprises a transformer network module 310, classification modules 312, similarity loss module 314, and a divergence loss module 316.

The transformer network module 310 may comprise a neural network. During training, the transformer network module 310 accepts as input first training representation data 220(1), associated with the first representation space 132(1), and produces as output first transformed representation data 156. As training progresses, the quality of the resulting first transformed representation data 156 may be expected to improve due to the loss values 360 that are returned as described below.

The first transformed representation data 156 is processed by a first classification module 312(1) to determine a first classification loss 342. In one implementation, the classification module 312 may utilize a HyperSpherical loss function as shown with regard to equations 1 and 2. In other implementations, other classification loss functions may be used. For example, other classification functions such as Softmax, Cosine, AM-Softmax, Arcface, large margin cosine loss, and so forth may be used.

The HyperSpherical Loss (HSL) function may also be used during training of the embedding networks of the embedding network modules 120. The HSL loss minimizes L which is the sum of a cross-entropy term, and a regularization term to regularize the confidence score (weighted by $\lambda$). $W_j$ denotes a classifier weight for $j^{th}$ class. C is the total number of training classes. M is the minibatch size. In in these equations m is a fixed angular margin. $\hat{W}$ and $\hat{x}$ are the unit-normalized form of W and x respectively. Also in these equations $x_i$ (embedding vector of input I) and $s_i$ are both outputs of the embedding network module 120, where $s_i$ is used only during training.

$$L = -\frac{1}{M}\sum_{i=1}^{M}\left(\log p_i - \lambda s_i^2\right) \qquad \text{(Equation 1)}$$

$$p_i = \frac{e^{s_i\left(\hat{W}_{y_i}^T \hat{x}_i - m\right)}}{e^{s_i\left(\hat{W}_{y_i}^T \hat{x}_i - m\right)} + \sum_{j=1, j\neq y_i}^{C} e^{\hat{W}_j^T \hat{x}_L}} \qquad \text{(Equation 2)}$$

$$p_i = \frac{e^{s_i\left(\hat{W}_{y_i}^T \hat{x}_i - m\right)}}{e^{s_i\left(\hat{W}_{y_i}^T \hat{x}_i - m\right)} + \sum_{j=1, j\neq y_i}^{C} e^{\hat{W}_j^T \hat{x}_i}}$$

The second training representation data 220(2) is processed by a second classification module 312(2) to determine a second classification loss 348. The second classification module 312(2) may utilize the same loss function as the first classification module 312(1). For example, the second classification module 312(2) may utilize the Hyper-Spherical loss function.

The similarity loss module 314 accepts as input the first transformed representation data 156 and the second training representation data 220(2) and determines a similarity loss 344.

In one implementation, the similarity loss module 314 may implement a mean squared error (MSE) and cosine distance loss function. In other implementations, other loss functions may be used. For example, an MSE loss may be used.

The divergence loss module 316 accepts as input the first classification loss 342 and the second classification loss 348 and determines a divergence loss 346. In one implementation, the divergence loss module 316 may implement a Kullback-Leibler divergence (KLD) function.

Loss value(s) 360 comprising one or more of the first classification loss 342, the second classification loss 348, the similarity loss 344, or the divergence loss 346 are then provided back to the transformer network module 310 for subsequent iterations during training.

Figure 4:
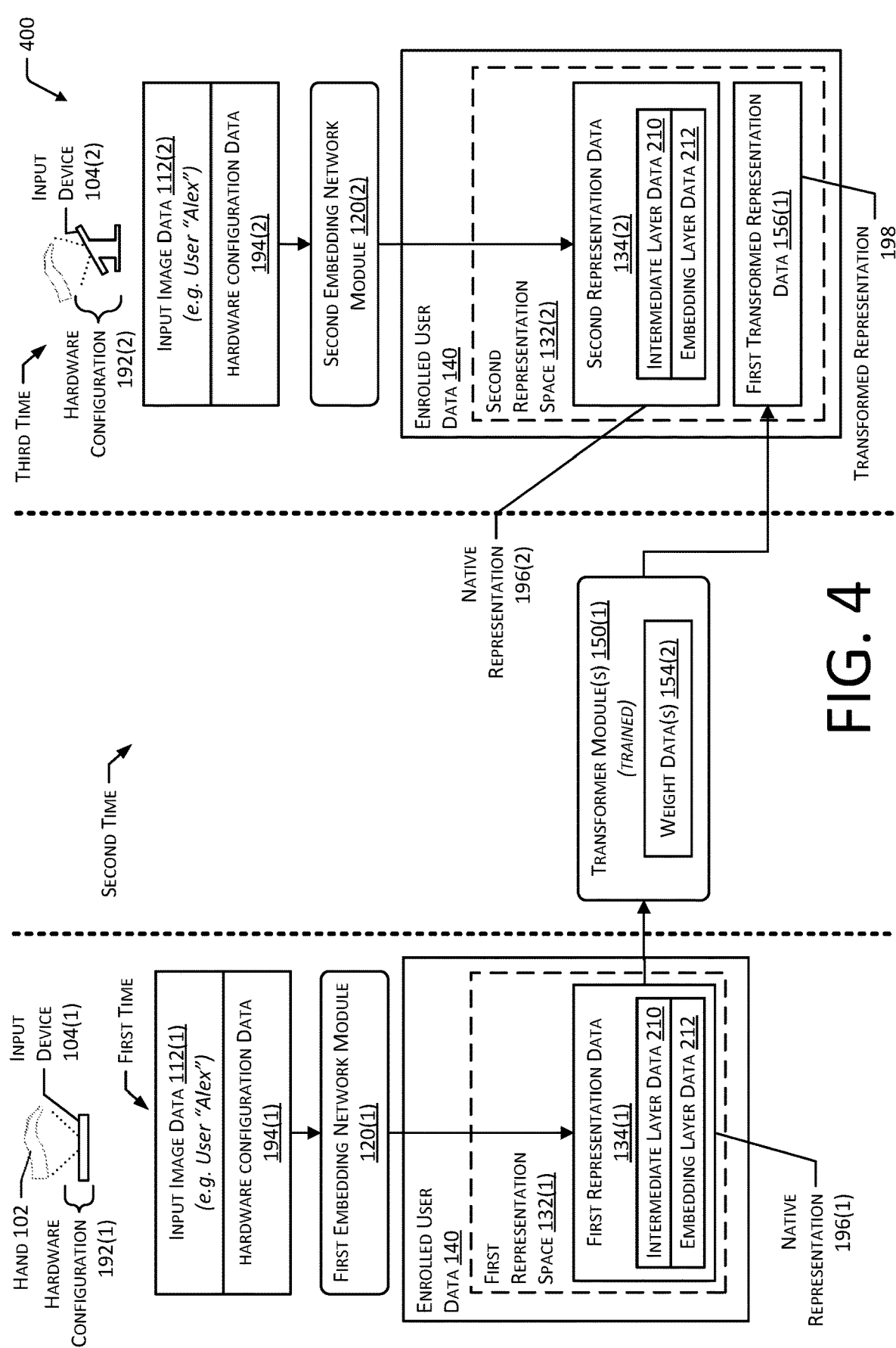
FIG. 4 illustrates transforming representation data to provide compatibility with another hardware configuration, according to some implementations.

FIG. 4 illustrates at 400 transforming representation data to provide compatibility with another hardware configuration 192, according to some implementations. In some implementations, the operations described may be implemented using one or more of the input devices 104, the computing devices 106, or other devices. This figure illustrates a first time, a second time, and a third time, with the various times separated by dotted lines.

At the first time, a first input device 104(1) associated with a first hardware configuration 192(1) is used to acquire first input image data 112(1) for a user "Alex". For example, the enrollment module 118 may be used to enroll user "Alex". First hardware configuration data 194(1) may also be associated with the first input image data 112(1). The first input image data 112(1) is processed by a first embedding network module 120(1) to determine first representation data 134(1) representative of Alex in a first representation space 132(1). The first representation data 134(1) is a native representation 196 with respect to the first representation space 132(1).

In some implementations, the first representation data 134(1) comprises, or is based on, intermediate layer data 210 and embedding layer data 212. The intermediate layer data 210 may comprise values associated with one or more layers of the first embedding network module 120(1) while processing the input image data 112(1). The embedding layer data 212 comprises the representation data that is provided by output of the first embedding network module 120(1). In one implementation, the intermediate layer data 210 may comprise values of a penultimate layer of a neural network of the first embedding network module 120(1). The penultimate layer may comprise the layer preceding the final output of the embedding layer data 212. In one implementation, the intermediate layer data 210 may comprise the values of a fully connected linear layer that precedes the output of the embedding layer data 212. The first representation data 134(1) may comprise a concatenation of the intermediate layer data 210 and the embedding layer data 212. In other implementations, the intermediate layer data 210 and the embedding layer data 212 may be otherwise combined.

At the second time, the transformer module 150(1) associated with the first representation space 132(1), trained as described in FIG. 3, is used to convert or transform the first representation data 134(1) to the first transformed representation data 156(1), with the first transformed representation data 156(1) being in the second representation space 132(2). This first transformed representation data 156(1) may be stored in the enrolled user data 140, along with the associated identification data 142 for "Alex".

As of the second time, the enrolled user data 140 for user "Alex" may comprise the first representation data 134(1) for Alex, the first transformed representation data 156(1), and associated identification data 142 (not shown).

At the third time, a second input device 104(2) that is associated with a second hardware configuration 192(2) is used to acquire second input image data 112(2), also for the user "Alex" who wishes to be identified by the system 100. Second hardware configuration data 194(2) may also be associated with the second input image data 112(2). The second input image data 112(2) is processed by a second embedding network module 120(2) to determine second representation data 134(2) representative of Alex in a second representation space 132(2). The second representation data 134(2) is a native representation 196(2) with respect to the second representation space 132(2). Due to the previous action of the transformer module 150(1) at the second time, the second representation space 132(2) now includes the first transformed representation data 156(1). With respect to the second representation space 132(2), the first transformed representation data 156(1) is a transformed representation 198.

During operation of the system 100, the comparison module 160 may compare the second representation data 134(2) that represents a query to the previously stored first transformed representation data 156(1). If the comparison module 160 determines that the second representation data 134(2) and the first transformed representation data 156(1) correspond to the same user, the second representation data 134(2) may be stored as enrolled user data 140 in the second representation space 132(2).

The enrolled user data 140 now comprises first representation data 134(1) for the first representation space 132(1) and second representation data 134(2) for the second representation space 132(2).

In other another implementation (not shown) another transformer module 150 may be used to process the second representation data 134(2) and provide second transformed representation data 156(2) for inclusion in the first representation space 132(1). This bidirectionality between representation spaces 132 may be used to provide ongoing updates to the representation data 134 stored therein. As a result, the system 100 may experience improved performance while adapting to changes in the user. For example, as the appearance of the user's hand 102 changes over time, the exchange of transformed representation data 156 may facilitate ongoing usability by the user with participating hardware configurations 192.

In some implementations, operation of the transformer modules 150 may be performed on-demand. In other implementations, the transformer modules 150 may operate to process representation data 134 in a batch. Such conversion may thus be completed before a query that would utilize the transformed representation data 156 is received. This implementation may reduce or eliminate latency in asserting identity that may result from an online or on-demand conversion process.

The implementation described with regard to FIG. 4 determines transformed representation data 156 that may be stored as enrolled user data 140 for later use, such as by the comparison module 160.

In the implementation depicted in FIG. 5, the native representations 196 (if available) in the enrolled user data 140 may be compared to a native representation of the query representation data 134(1) and query transformed representation data 156.

FIG. 5 illustrates at 500 a query using native and transformed representation data, according to some implementations. In some implementations, the operations described may be implemented using one or more of the input devices 104, the computing devices 106, or other devices.

In this illustration, query input image data 112 is acquired using an input device 104(1) associated with a first hardware configuration 192(1). First hardware configuration data 194 (1) may also be associated with the query input image data 112. The input image data 112 is processed by a first embedding network module 120(1) to determine first query representation data 134(1) in the first representation space 132(1). The query first representation data 134(1) is a native representation 196 with respect to the first representation space 132(1).

A management module 502 may coordinate the operation of the one or more transformer modules 150(1)-(T). The management module 502 may operate based on compatibility matrix data 504. The compatibility matrix data 504 may comprise information indicative of which hardware configurations 192 and transformer modules 150 are to be used to maintain multiconfigurational compatibility. The compatibility matrix data 504 is discussed in more detail with regard to FIG. 6.

Based on the compatibility matrix data 504, the management module 502 determines that the first hardware configuration 192(1) is to maintain compatibility with the second hardware configuration 192(2) associated with the second representation space 132(2). The query representation data 134(1) is processed by the transformer module 150(2) to determine query first transformed representation data 156(1). The query first transformed representation data 156(1) is associated with the second representation space 132(2).

The first query representation data 134(1) may be provided to the comparison module 160. The comparison module 160 may compare the first query representation data 134(1) with the enrolled user data 140 associated with the first representation space 132(1), such as the first representation data 134(1).

The query first transformed representation data 156(1) may also be provided to the comparison module 160. The comparison module 160 may compare the query first transformed representation data 156(1) with the enrolled user data 140 associated with the second representation space 132(2), such as the second representation data 134(2).

The comparison module 160 may then provide as output asserted identification data 164 indicative of an asserted identity of the user and their hand 102 as presented to the input device 104(1). In some implementations the comparison module 160 may also use transformed representation data 156.

In some implementations, the comparison module 160 may perform two or more "cross" comparisons to determine the asserted identification data 164. If at least a threshold portion of the cross comparisons indicate correspondence exceeding a threshold value, then an identity may be asserted. For example, respective instances of query transformed representation data 156 may be compared to respective instances of previously stored representation data 134 associated with the same representation space 132, and query representation data 134 may be compared to respective instances of previously determined transformed representation data 156. Continuing the example, if both sets of comparisons all are indicative of respective matches, the identity corresponding to all matches may be asserted.

FIG. 6 illustrates at 600 compatibility matrix data 504 indicative of hardware configurations and respective representation data to be transformed in, according to some implementation. The compatibility matrix data 504 may be stored within the memory 820 of one or more of the devices described herein. The compatibility matrix data 504 is shown as a table for ease of illustration, and not necessarily as a limitation. In other implementations, other data structures may be used to store the compatibility matrix data 504.

In this illustration the various physical configurations 602(1), 602(2), 602(3), 602(4) . . . , 602(P) are depicted with associated hardware configurations 192(1), 192(2), 192(3), 192(4), 192(5) . . . , 192(N). As described above, a single physical configuration 602 of input device 104 may be associated with a plurality of hardware configurations 192. For example, the same physical configuration 602(4) is associated with both hardware configuration 192(4) and 192(5). Continuing the example, hardware configuration 192(4) may be associated with a first illumination mode, such as low light/nighttime operation while hardware configuration 192(5) is associated with a second illumination mode, such as bright light/daytime operation.

Also shown are the first representation space 132(1), the second representation space 132(2), fourth representation space 132(4), fifth representation space 132(5), . . . , 132(S). For various combinations of hardware configuration 192 and representation space 132 compatibility attributes may be specified. These may include no compatibility indicated by a null entry, "native" indicating no transformation necessary as this is the native representation space 132, "transform" indicating that a corresponding transformer module 150 is used to generate transformed representation data 156 in this space, "no transformation" indicating no transformation is to be performed. The "no transformation" option may be utilized in situations where compatibility is not desired. For example, incompatibility may be acceptable in situations in which the resulting operation using transformed representation data 156 would result in system 100 performance below specified thresholds.

The compatibility supported by the system 100 may be asymmetrical. For example, in this illustration hardware configuration 192(3) is compatible with the first representation space 132(1) (that is associated with the first hardware configuration 192(1)) and is not compatible with the second representation space 132(2) that is associated with the second hardware configuration 192(2).

Figure 7:
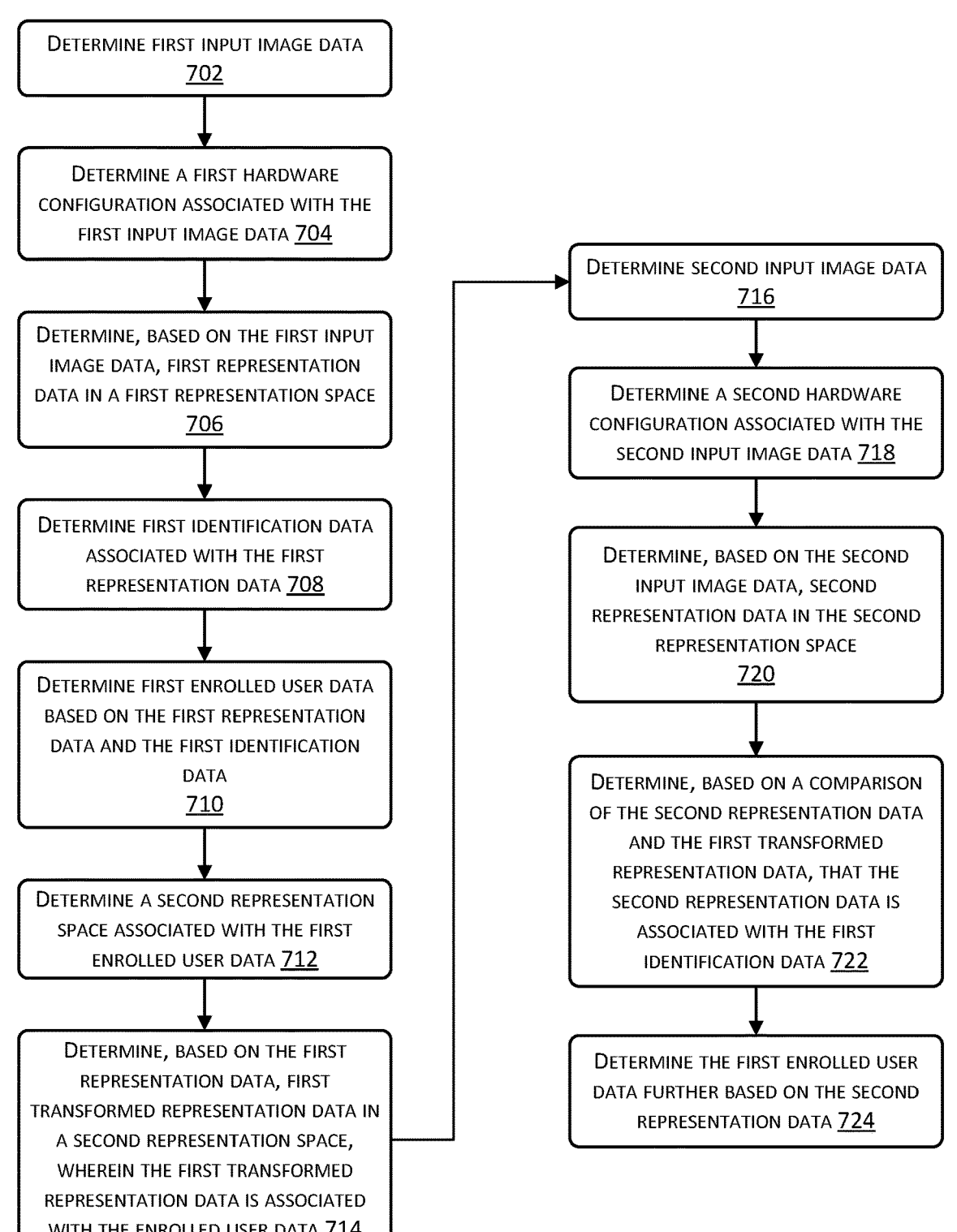
FIG. 7 is a flow diagram of enrolling with a first hardware configuration and backfilling representation data to a second hardware configuration, according to some implementation.

FIG. 7 is a flow diagram 700 of a process of enrolling with a first hardware configuration 192(1) and backfilling representation data to a second hardware configuration 192(2), according to some implementations. In some implementations, the operations described may be implemented using one or more of the input devices 104, computing devices, or other devices.

At 702 first input image data 112(1) is determined. For example, a first input device 104(1) associated with a first hardware configuration 192(1) may be used to acquire the first input image data 112(1) associated with one or more modalities. Continuing the example, the first input image data 112(1) may comprise first modality image data 114 and second modality image data 116.

At 704 a first hardware configuration 192(1) associated with the first input image data 112(1) is determined. For example, the first input device 104(1) may send hardware configuration data 194(1) indicative of the first hardware configuration 192(1).

At 706, based on the first input image data 112(1), first representation data 134(1) in a first representation space 132(1) is determined. For example, the first input image data 112(1) is processed by the first embedding network module 120(1) to determine the first representation data 134(1). In some implementations the selection of the embedding network module 120 used may be based on the hardware configuration data 194.

At 708 first identification data 142(1) associated with the first representation data 134(1) is determined. For example, during an enrollment process the enrollment module 118 may acquire first identification data 142(1) from the user who has presented their hand 102 associated with the first input image data 112(1).

At 710 first enrolled user data 140 is determined based on the first representation data 134(1) and the first identification data 142(1). For example, the first representation data 134(1) may be associated with the first identification data 142(1).

At 712 a second representation space 132 or second hardware configuration 192(2) is determined that is associated with the enrolled user data 140. For example, the enrolled user data 140 may be associated with a particular set of compatibility matrix data 504 specifying hardware between a specified set of hardware configurations 192.

At 714, based on the first representation data 134(1) associated with the first representation space 132(1), first transformed representation data 156(1) is determined. For example, the first representation data 134(1) may be processed by the first transformer module 150(1) to determine the first transformed representation data 156(1). The first transformed representation data 156(1) is associated with the second representation space 132(2). The first transformed representation data 156(1) may be associated with the enrolled user data 140. For example, the first transformed representation data 156(1) may be associated with the identification data 142 determined above.

In some implementations the selection of the transformer module(s) 150 used may be based on one or more of the hardware configuration data 194, or the compatibility matrix data 504.

At 716 second input image data 112(2) is determined. For example, a second input device 104(2) associated with a second hardware configuration 192(2) may be used to acquire the second input image data 112(2) associated with one or more modalities. Continuing the example, the second input image data 112(2) may comprise second modality image data 116 and third modality image data, such as obtained using an RGB camera.

At 718 a second hardware configuration 192(2) associated with the second input image data 112(2) is determined. For example, the second input device 104(2) may send hardware configuration data 194(2) indicative of the second hardware configuration 192(2).

At 720, based on the second input image data 112(2), second representation data 134(2) in the second representation space 132(2) is determined. For example, the second input image data 112(2) is processed by the second embedding network module 120(2) to determine the second representation data 134(2). In some implementations the selection of the embedding network module 120 used may be based on the hardware configuration data 194.

At 722, based on a comparison of the second representation data 134(2) and the first transformed representation data 156(1), the second representation data 134(2) is determined to be associated with the first identification data 142. For example, the comparison module 160 may determine asserted identification data 164 indicating that the hand 102 represented in the second input image data 112(1) is associated with the hand 102 represented in the first input image data 112(2).

At 724 the first enrolled user data 140 may be determined based on the second representation data 134(2). For example, the second representation data 134(2) may be stored in the enrolled user data 140 as a native representation 196 of the user.

Figure 8:
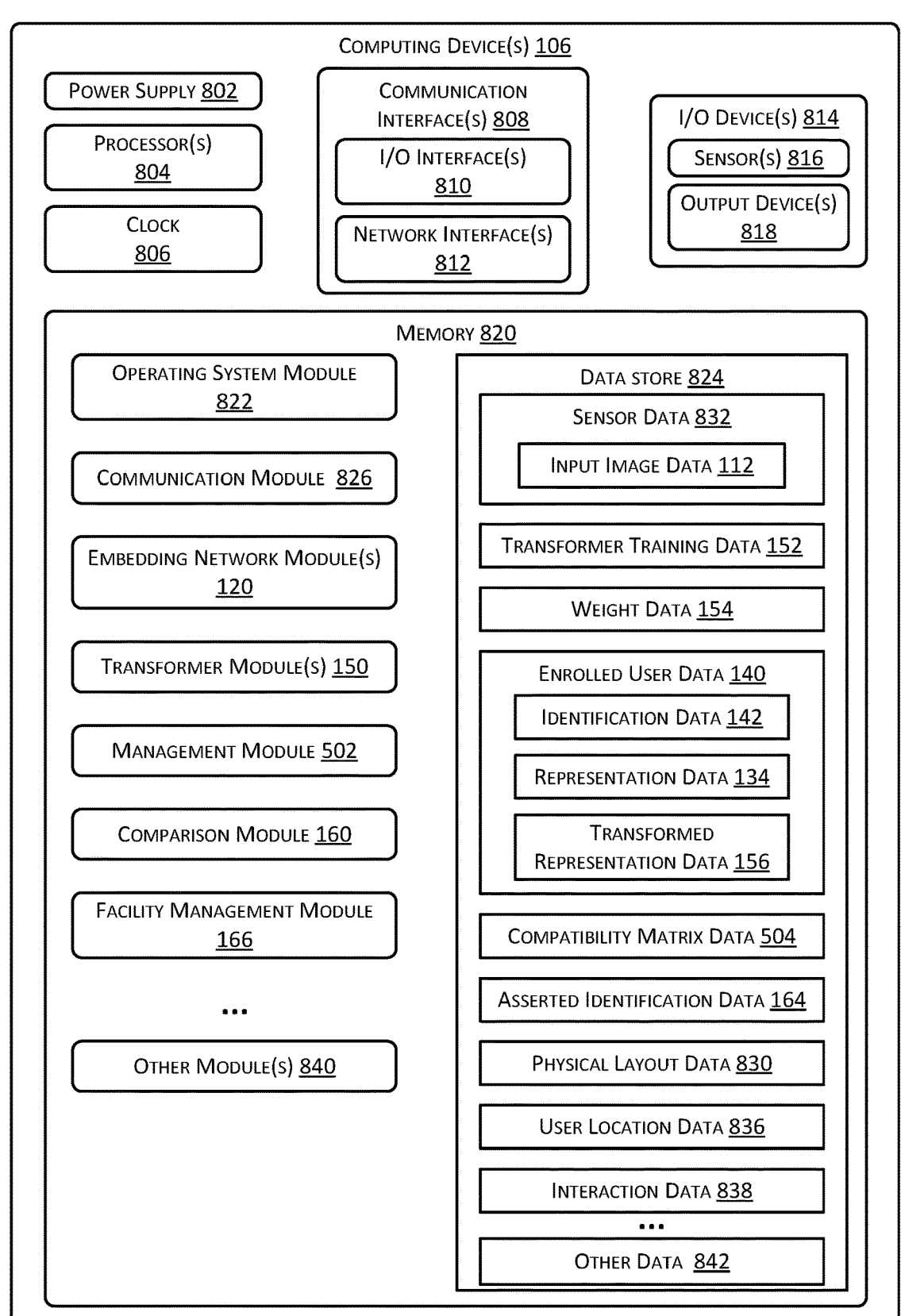
FIG. 8 is a block diagram of a computing device to implement the system, according to some implementations.

FIG. 8 is a block diagram of a computing device 106 to implement the system 100, according to some implementations. The computing device 106 may be within the input device 104, may comprise a server, and so forth. The computing device 106 may be physically present at the facility, may be accessible by a network, or a combination of both. The computing device 106 does not require end-user knowledge of the physical location and configuration of the system that delivers the services. Common expressions associated with the computing device 106 may include "embedded system", "on-demand computing", "software as a service (SaaS)", "platform computing", "network-accessible platform", "cloud services", "data centers", and so forth. Services provided by the computing device 106 may be distributed across one or more physical or virtual devices.

One or more power supplies 802 may be configured to provide electrical power suitable for operating the components in the computing device 106. The one or more power supplies 802 may comprise batteries, capacitors, fuel cells, photovoltaic cells, wireless power receivers, conductive couplings suitable for attachment to a power source such as provided by an electric utility, and so forth. The computing device 106 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to associate a particular interaction with a particular point in time.

The computing device 106 may include one or more communication interfaces 808 such as input/output (I/O) interfaces 810, network interfaces 812, and so forth. The communication interfaces 808 enable the computing device 106, or components thereof, to communicate with other devices or components. The communication interfaces 808 may include one or more I/O interfaces 810. The I/O interfaces 810 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 810 may couple to one or more I/O devices 814. The I/O devices 814 may include input devices such as one or more of a sensor 816, keyboard, mouse, input device, and so forth. The I/O devices 814 may also include output devices 818 such as one or more of a display device, printer, audio speakers, and so forth. In some embodiments, the I/O devices 814 may be physically incorporated with the computing device 106 or may be externally placed. The sensors 816 may comprise the camera 108, smartcard readers, touch sensors, microphones, and so forth.

The network interfaces 812 may be configured to provide communications between the computing device 106 and other devices, such as routers, access points, and so forth. The network interfaces 812 may include devices configured to couple to personal area networks (PANS), local area networks (LANs), wireless local area networks (WLANS), wide area networks (WANs), and so forth. For example, the network interfaces 812 may include devices compatible with Ethernet, Wi-Fi, Bluetooth, and so forth.

The computing device 106 may also include one or more buses or other internal communications hardware or software that allow for the transfer of data between the various modules and components of the computing device 106.

As shown in FIG. 8, the computing device 106 includes one or more memories 820. The memory 820 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 820 provides storage of computer-readable instructions, data structures, program modules, and other data for the operation of the computing device 106. A few example functional modules are shown stored in the memory 820, although the same functionality may alternatively be implemented in hardware, firmware, or as a system on a chip (SoC).

The memory 820 may include at least one operating system (OS) module 822. The OS module 822 is configured to manage hardware resource devices such as the I/O interfaces 810, the I/O devices 814, the communication interfaces 808, and provide various services to applications or modules executing on the processors 804. The OS module 822 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 826 may be configured to establish communications with the computing device 106, servers, other computing devices 106, or other devices. The communications may be authenticated, encrypted, and so forth.

Also stored in the memory 820 may be a data store 824 and one or more of the following modules. These modules may be executed as foreground applications, background tasks, daemons, and so forth. The data store 824 may use a flat file, database, linked list, tree, executable code, script, or other data structure to store information. In some implementations, the data store 824 or a portion of the data store 824 may be distributed across one or more other devices including the computing devices 106, network attached storage devices, and so forth.

The data store 824 may store one or more of the transformer training data 152, the trained weight data 154, enrolled user data 140, query representation data 162, compatibility matrix data 504, and so forth. The memory 820 may store the embedding network module(s) 120, the transformer module(s) 150, the management module 502, the comparison module 160, the facility management module 166, and so forth.

In some implementations, the input image data 112 may be temporarily stored during processing by the embedding network module 120. For example, the input device 104 may acquire the input image data 112, determine representation data 134 based on the input image data 112, and then erase the input image data 112. The resulting representation data 134 may then be sent to a server or other computing device 106 to perform enrollment, comparison to assert an identity, and so forth.

The facility management module 166 may perform various functions, such as tracking items between different inventory locations, to and from carts, generating restocking orders, directing operation of robots within the facility, using the asserted identification data 164 to associate a particular user identity with a user in the facility, and so forth. During operation, the facility management module 166 may access sensor data 832 such as input image data 112, or data from other sensors.

Information used by the facility management module 166 may be stored in the data store 824. For example, the data store 824 may be used to store physical layout data 830, sensor data 832, query aggregated representation data 704, asserted identification data 164, user location data 836, interaction data 838, and so forth. For example, the sensor data 832 may comprise the input image data 112 obtained from an input device 104 associated with the facility.

The physical layout data 830 may provide information indicative of where input devices 104, cameras, weight sensors, antennas for radio receivers, inventory locations, and so forth are in the facility with respect to one another. For example, the physical layout data 830 may comprise information representative of a map or floor plan of the facility with relative positions of gates with input devices 104 and inventory locations.

The facility management module 166 may generate the user location data 836 that is indicative of the location of the user within the facility. For example, the facility management module 166 may use image data obtained by the cameras to determine a location of the user. In other implementations, other techniques may be used for determining the user location data 836. For example, data from a smart floor may be used to determine the location of the user.

The identification data 142 may be associated with user location data 836. For example, the user enters the facility and has their hand 102 scanned by the input device 104, resulting in asserted identification data 164 that is associated with their time of entry and the input device 104 location. The user location data 836 indicative of a path of a user that begins at the input device 104 location at the time of entry may be associated with the user identifier in the asserted identification data 164.

Based on the user location data 836 and the interaction data 838, a particular interaction may be associated with an account of a particular user. For example, if the user location data 836 indicates that the user is present in front of inventory location 892 at time 09:02:02 and the interaction data 838 indicates a pick of a quantity of one item from an area on inventory location 892 at 09:04:13, the user may be billed for that pick.

The facility management module 166 may use the sensor data 832 to generate the interaction data 838. The interaction data 838 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 166 may generate interaction data 838 that indicates what item the user picked from a particular lane on a shelf, and then use this interaction data 838 to adjust the count of inventory stowed at that lane. The interaction data 838 may then be used to bill an account associated with the user identifier that is associated with the user who picked the item.

The facility management module 166 may process the sensor data 832 and generate output data. For example, based on the interaction data 838, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 840 may also be present in the memory 820 as well as other data 842 in the data store 824. For example, a billing module may use the interaction data 838 and the asserted identification data 164 to bill an account associated with a particular user.

The devices and techniques described in this disclosure may be used in a variety of other settings. For example, the system 100 may be used in conjunction with a point-of-sale (POS) device. The user may present their hand 102 to an input device 104 to provide an indication of intent and authorization to pay with an account associated with the asserted identification data 164. In another example, a robot may incorporate an input device 104. The robot may use the asserted identification data 164 to determine whether to deliver a parcel to the user, and based on the asserted identification data 164, which parcel to deliver.

While the input to the system 100 is discussed with respect to image data, the system may be used with other types of input. For example, the input may comprise data acquired from one or more sensors, data generated by another system, and so forth. For example, instead of image data produced by the camera 108, the input to the system 100 may comprise an array of data. Other modalities may also be used. For example, the first modality may be visible light, the second modality may be sonar, and so forth.

While the system 100 is discussed with respect to processing biometric data, the system may be used with other types of data. For example, the input may comprise satellite weather imagery, seismic data, product images, data indicative of chemical composition, and so forth. For example, instead of image data produced by the camera 108, the input to the system 100 may comprise an array of data.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a memory, storing first computer-executable instructions; and
   a hardware processor to execute the first computer-executable instructions to:
      determine first input image data acquired using a first input device associated with a first hardware configuration, wherein the first input device comprises a dedicated biometric input device;
      determine first representation data based on processing the first input image data with a first embedding model, wherein the first representation data is associated with a first representation space;
      determine first transformed representation data based on processing the first representation data with a first transformer network, wherein:
         the first transformed representation data is associated with a second representation space, and
         the second representation space is associated with a second hardware configuration comprising one of a smartphone device, a tablet device, a laptop computer, a home security device, or a desktop computer; and
      determine first data indicative of an association between the first representation data and the first transformed representation data.

2. The system of claim 1, the hardware processor to further execute the first computer-executable instructions to:
   determine first identification data; and
   wherein the first data associates the first identification data with the first representation data and the first transformed representation data.

3. The system of claim 1, the hardware processor to further execute the first computer-executable instructions to:
   determine second data indicative of a correspondence between the first representation data and first enrolled user data associated with the first representation space being less than a threshold value;
   determine third data indicative of a correspondence between the first transformed representation data and the first enrolled user data associated with the second representation space being greater than or equal to the threshold value; and
   determine, based on the third data, that the first enrolled user data is associated with the first input image data.

4. The system of claim 3, the hardware processor to further execute the first computer-executable instructions to:
   store the first representation data as associated with the first enrolled user data.

5. The system of claim 1, the hardware processor to further execute the first computer-executable instructions to;
   determine second input image data acquired using a second input device associated with the second hardware configuration;
   determine second representation data based on processing the second input image data with a second embedding model, wherein the second representation data is associated with the second representation space;

determine second data indicative of a correspondence between the second representation data and the first transformed representation data being greater than or equal to a threshold value; and determine third data indicative of an association between the first representation data and the second representation data.

6. The system of claim 1, wherein:

the first input device associated with the first hardware configuration acquires image data using a first illumination mode; and the second representation space is associated with the first input device using a second illumination mode.

7. The system of claim 1, wherein:

the first input image data comprises first biometric image data.

8. A method comprising:

acquiring first biometric input image data using a first input device that is associated with a first hardware configuration;

determining first representation data based on processing the first biometric input image data with a first embedding model, wherein the first representation data is associated with a first representation space;

determining first transformed representation data based on processing the first representation data with a first transformer network, wherein the first transformed representation data is associated with a second representation space;

determining first data indicative of an association between the first representation data and the first transformed representation data;

acquiring second biometric input image data; and determining second representation data based on processing the second biometric input image data with a second embedding model, wherein the second representation data is associated with the second representation space.

9. The method of claim 8, further comprising:

determining first identification data; and wherein the first data associates the first identification data with the first representation data and the first transformed representation data.

10. The method of claim 8, further comprising:

determining second data indicative of a correspondence between the first representation data and first enrolled user data associated with the first representation space being less than a threshold value;

determining third data indicative of a correspondence between the first transformed representation data and the first enrolled user data associated with the second representation space being greater than or equal to the threshold value; and determining, based on the third data, that the first enrolled user data is associated with the first biometric input image data.

11. The method of claim 10, further comprising:

storing the first representation data as associated with the first enrolled user data.

12. The method of claim 8, further comprising:

determining second data indicative of a correspondence between the second representation data and the first transformed representation data being greater than or equal to a threshold value; and determining third data indicative of an association between the first representation data and the second representation data.

13. The method of claim 8, wherein:

the first representation space is associated with input image data representative of images acquired using one or more of a first set of wavelengths of light or a first illumination mode; and the second representation space is associated with input image data representative of images acquired using one or more of a second set of wavelengths of light or a second illumination mode.

14. A system comprising:

a memory, storing first computer-executable instructions; and a hardware processor to execute the first computer-executable instructions to:

determine first representation data based on processing first input image data with a first embedding model, wherein the first representation data is associated with a first representation space, wherein the first representation space is associated with input image data representative of images acquired using one or more of a first set of wavelengths of light or a first illumination mode;

determine first transformed representation data based on processing the first representation data with a first transformer network, wherein the first transformed representation data is associated with a second representation space, wherein the second representation space is associated with input image data representative of images acquired using one or more of a second set of wavelengths of light or a second illumination mode; and determine first data indicative of an association between the first representation data and the first transformed representation data.

15. The system of claim 14, the hardware processor to further execute the first computer-executable instructions to:

determine, based on one or more of the first representation data or the first transformed representation data, first enrolled user data;

determine, based on the first enrolled user data, a first set of representation spaces; and determine a first set of transformed representation data based on processing the first representation data with respective transformer networks, wherein each respective transformer network is associated with a respective one of the first set of representation spaces.

16. The system of claim 14, the hardware processor to further execute the first computer-executable instructions to:

determine a first hardware configuration associated with the first representation data;

determine, based on the first hardware configuration, a first set of representation spaces; and determine a first set of transformed representation data based on processing the first representation data with respective transformer networks, wherein each respective transformer network is associated with a respective one of the first set of representation spaces.

17. The system of claim 14, the hardware processor to further execute the first computer-executable instructions to:

determine first identification data; and wherein the first data associates the first identification data with the first representation data and the first transformed representation data.

18. The system of claim 14, the hardware processor to further execute the first computer-executable instructions to;

determine second representation data based on processing second input image data with a second embedding model, wherein the second representation data is associated with the second representation space;

determine second data indicative of a correspondence between the second representation data and the first transformed representation data being greater than or equal to a threshold value; and determine third data indicative of an association between the first representation data and the second representation data.

19. The system of claim 14, further comprising:

a first input device associated with a first hardware configuration, wherein the first input device acquires the first input image data using one or more image sensors that detect a first set of wavelengths; and a second input device associated with a second hardware configuration, wherein the second input device acquires second input image data using one or more image sensors that detect a second set of wavelengths; and the hardware processor to further execute the first computer-executable instructions to:

determine second representation data based on processing the second input image data with a second embedding model, wherein the second representation data is associated with the second representation space.

20. The system of claim 14, further comprising:

a first input device comprising a smartphone device, tablet device, laptop computer, desktop computer, or a home security device, wherein the first input device acquires the first input image data;

a second input device comprising a smartphone device, tablet device, laptop computer, desktop computer, network connected camera, or a home security device, wherein the second Input device acquires second input image data; and the hardware processor to further execute the first computer-executable instructions to:

determine second representation data based on processing the second input image data with a second embedding model, wherein the second representation data is associated with the second representation space.

* * * * *